Jan. 12, 1926.  
N. C. BARNES  
AUTOMOBILE CRANK HOLDER  
Filed Dec. 5, 1925
1,569,530
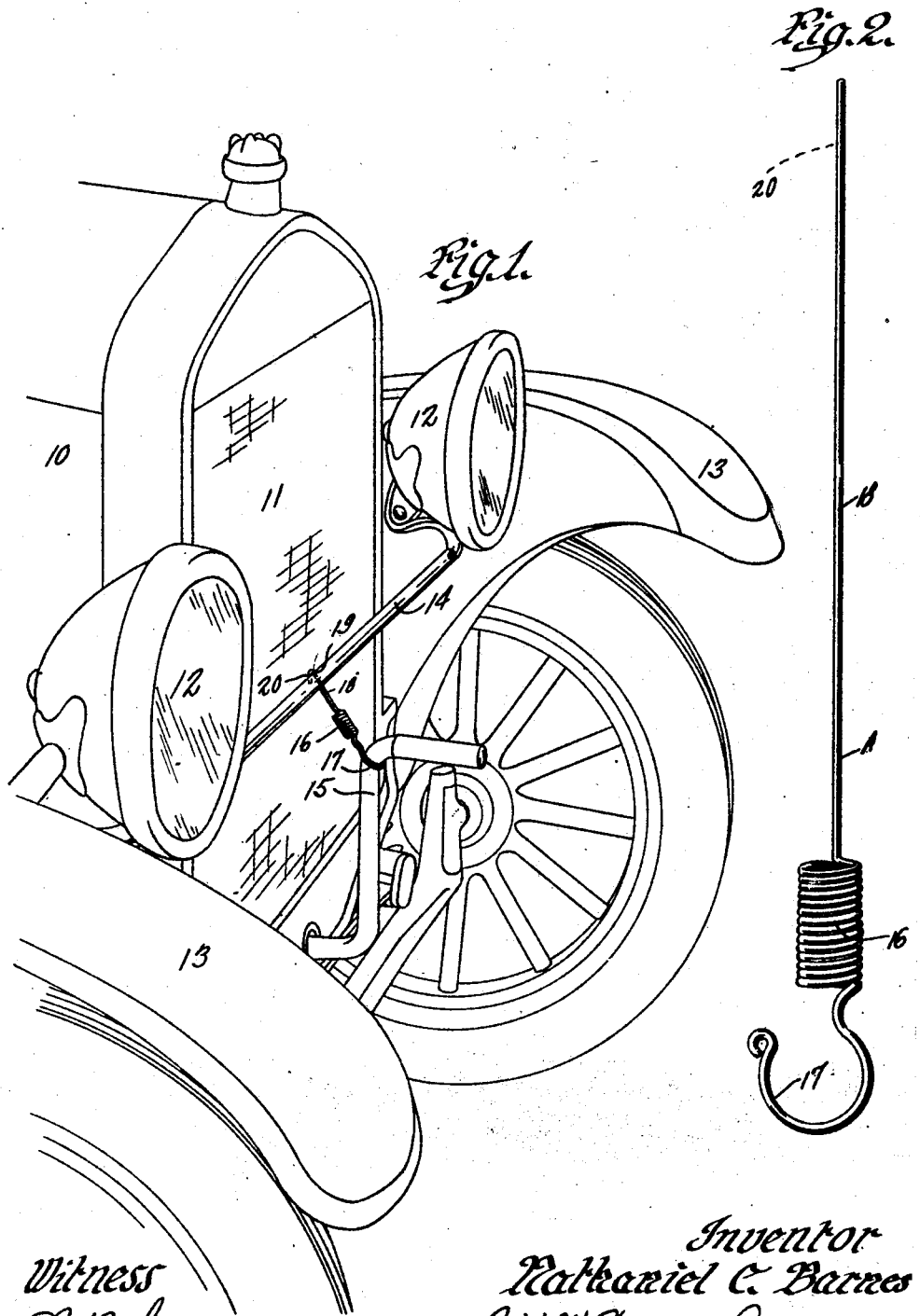

Patented Jan. 12, 1926.

1,569,530

UNITED STATES PATENT OFFICE.

NATHANIEL C. BARNES, OF DES MOINES, IOWA.

AUTOMOBILE CRANK HOLDER.

Application filed December 5, 1925. Serial No. 73,506.

*To all whom it may concern:*

Be it known that I, NATHANIEL C. BARNES, a citizen of the United States, residing at Des Moines, in the county of Polk and State of Iowa, have invented a certain new and useful Automobile Crank Holder, of which the following is a specification.

The object of my invention is to provide an automobile crank holder of simple, durable and comparatively inexpensive construction.

More particularly, my invention relates to a crank holder adapted to be used in combination with a transverse member extending between the fenders to which the holder proper is secured, whereby the crank of the automobile may be engaged by a portion of the holder and held in raised position.

Still a further object is to provide a holder formed of a single piece of wire bent to provide an extensible coil intermediate of its ends and a hook at one end for engagement with the crank and a stem on the other end whereby the holder may be anchored in position upon a fender cross brace.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of the front portion of an automobile showing a fender brace extending between the fenders and my improved crank holder connected therewith and with the crank; and Figure 2 is a perspective view of my crank holder.

In the accompanying drawings, I have used the reference numeral 10 to indicate generally an automobile provided with a radiator 11 and lights 12.

The usual wheel fenders 13 are provided, which are connected together by a cross brace or member 14.

The brace 14 connects the two lamp brackets together as well as the fenders themselves. The brace 14 extends just forward of the radiator 11.

The automobile 10 is further provided with the ordinary hand starting crank 15.

In the well known type of automobile, such as the Ford, the crank 15 is permitted to swing and it is quite desirable to provide a suitable holder for retaining it in raised position, as shown in Figure 1 of the drawing.

In order to provide an efficient holder, I have the cross brace 14 provided with a small opening through which the holder itself may be extended for anchoring the holder to the cross piece, as I will now describe in detail.

My improved holder comprises a single piece of wire A bent between its ends to form an extensible spring coil 16.

The lower end of the coil 16 is bent to form a substantial opening loop or hook 17, which is adapted to engage the crank holder 15, as clearly shown in Figure 1 of the drawings.

The opening in the hook 17 is slightly contracted so that there is a positive "snap over" of the hook when it engages the crank holder 15. The hook 17 being formed of flexible or spring material permits the "snap over" and insures positive connection between the shoulder itself and the crank holder 15.

The wire A above the coil 16 forms a connector 18, which is designed to be extended through the opening 19 formed in the cross brace 14 heretofore referred to.

The connector 18 is extended through the opening 19 in the brace 14 a sufficient distance for insuring the hook end 17 to properly engage the crank holder 15 and thereafter the extended end of the connector 18 is bent over, as at 20, for anchoring the entire holder to the cross brace 14.

The extensible coil 16 takes care of any slight adjustment necessary and also serves as a tensioning means for normally holding the crank against undue vibration.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with an automobile having a pair of spaced fenders, a connecting member between the fender and a crank, of a holder for the crank comprising a single piece of wire bent to form a coil spring, a hook formed from the end of the wire engageable with the crank and a portion of said wire being connected with the connecting member between the fenders.

2. In combination with an automobile having a pair of spaced fenders and a crank for the engine of the automobile, of a holder for the crank comprising a member extending between the fenders just forwardly of the radiator, a single piece of wire bent to form a hook at one end, an extensible coil formed of said wire just above the hook and the free end of said wire being connected to the member extending between the fenders.

3. In combination with an automobile having a pair of spaced fenders and a crank for the engine of the automobile, of a holder for the crank comprising a member extending between the fenders just forwardly of the radiator and having an opening therein, a single piece of wire bent to form a hook at one end, an extensible coil formed of said wire just above the hook and the free end of said wire extending through the opening in said member and being bent to anchor the wire thereto.

4. In combination with an automobile having a pair of spaced fenders and a crank for the engine of the automobile, of a holder for the crank comprising a member extending between the fenders just forwardly of the radiator and having an opening therein, a single piece of wire bent to form a hook at one end, an extensible coil formed of said wire just above the hook and the free end of said wire extending through the opening in said member.

5. In combination with an automobile having a pair of spaced fenders and a crank for the engine of the automobile, of a holder for the crank comprising a member extending between the fenders just forwardly of the radiator, a single piece of wire bent to form a hook at one end, said hook being designed to receive the crank and being yieldable for snapping over the crank, an extensible coil formed of said wire just above the hook and the free end of said wire being connected to the member extending between the fenders.

Des Moines, Iowa, October 10, 1925.

NATHANIEL C. BARNES.